United States Patent
Han et al.

(10) Patent No.: US 12,216,374 B2
(45) Date of Patent: Feb. 4, 2025

(54) ARRAY SUBSTRATE AND MANUFACTURING METHOD THEREOF, DISPLAY PANEL, DISPLAY DEVICE, DISPLAY KIT

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Lele Han, Beijing (CN); Peng Li, Beijing (CN); Jiong Huang, Beijing (CN); Wencheng Hu, Beijing (CN); Guojun Zhang, Beijing (CN); Chao Zhou, Beijing (CN)

(73) Assignees: HEIFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 758 days.

(21) Appl. No.: 16/964,696

(22) PCT Filed: Dec. 25, 2019

(86) PCT No.: PCT/CN2019/128311
§ 371 (c)(1),
(2) Date: Sep. 27, 2021

(87) PCT Pub. No.: WO2020/173206
PCT Pub. Date: Sep. 3, 2020

(65) Prior Publication Data
US 2022/0035220 A1 Feb. 3, 2022

(30) Foreign Application Priority Data
Feb. 28, 2019 (CN) .......................... 201910151315.9

(51) Int. Cl.
*G02F 1/1673* (2019.01)
*G02F 1/16757* (2019.01)
(Continued)

(52) U.S. Cl.
CPC ........ *G02F 1/1673* (2019.01); *G02F 1/16757* (2019.01); *G02F 1/1679* (2019.01);
(Continued)

(58) Field of Classification Search
CPC .......... G09F 9/375; G09F 9/372; G09F 9/302; G02F 1/167; G02F 1/094;
(Continued)

(56) References Cited

U.S. PATENT DOCUMENTS 5,057,363 A * 10/1991 Nakanishi ............... G09F 9/375
446/131
7,561,140 B1 7/2009 Kanno
(Continued)

FOREIGN PATENT DOCUMENTS

CN 101604105 A 12/2009
CN 101840290 A 9/2010
(Continued)

OTHER PUBLICATIONS

First Office Action, including Search Report, for Chinese Patent Application No. 201910151315.9, dated Apr. 17, 2020, 12 pages.

*Primary Examiner* — Brandi N Thomas
(74) *Attorney, Agent, or Firm* — Westman, Champlin & Koehler, P.A.

(57) ABSTRACT

Embodiments of the present application provide an array substrate and manufacturing method thereof, and a display panel, display device, display kit. The array substrate includes: a base substrate, and a reflective layer on a side of the base substrate; the reflective layer includes: a plurality of micro-capsules; each of the micro-capsules includes: a plu-
(Continued)

rality of absorbing particles and a plurality of reflecting particles; the absorbing particles are magnetic particles absorbing light; the reflecting particles are non-magnetic particles reflecting light.

13 Claims, 4 Drawing Sheets (51) Int. Cl.
*G02F 1/1679* (2019.01)
*G02F 1/1685* (2019.01)
*G02F 1/1675* (2019.01)
*G02F 1/1677* (2019.01)

(52) U.S. Cl.
CPC .... *G02F 1/1677* (2019.01); *G02F 2001/1678* (2013.01); *G02F 1/1685* (2019.01); *G02F 2201/16* (2013.01); *G02F 2201/44* (2013.01)

(58) Field of Classification Search
CPC ......... G02F 2001/1678; G02F 1/16757; G02F 1/09; G02F 1/1681; G02F 1/1673; G02F 1/1685; G02F 1/1679; G02F 1/133305; G02F 1/1334; G02F 2202/28; G02F 1/1677; G02F 1/091; G02F 1/13336; G02F 1/172; G02F 2202/12; G02F 2201/12; G02F 1/133348; G02F 1/1343; G02F 1/1345; G02F 1/135; G02F 1/1365; G02F 1/13338; G02F 1/133553; G02F 1/13439; G02F 1/166; G02F 1/1675; G02F 2201/16; G02F 2201/44; G02F 2202/36; G02F 1/133618; G02F 2203/62; G02F 2203/34; G02F 1/134363; G02F 1/1362; G02F 1/136295; G02F 1/1676; G02F 1/134309; G02F 1/092; G02F 1/13306; G02F 1/134336; G02F 1/1368; G02F 1/16762; G02F 2201/121; G02F 2201/123; G02F 2202/022; G02F 2202/04; G02F 1/00; G02F 1/0027; G02F 1/0327; G02F 1/1347; G02F 1/1671
See application file for complete search history.

(56) References Cited

U.S. PATENT DOCUMENTS

| 10,585,326 | B2 | 3/2020 | Zhao et al. | |
|---|---|---|---|---|
| 2012/0249609 | A1 | 10/2012 | Yamaguchi et al. | |
| 2013/0200313 | A1* | 8/2013 | Fox | B82Y 30/00 204/157.43 |
| 2014/0285757 | A1* | 9/2014 | Tamaki | G02F 1/133707 349/113 |
| 2016/0188119 | A1* | 6/2016 | Ham | G02F 1/0131 345/175 |
| 2017/0178573 | A1* | 6/2017 | Hsiang | G09G 3/344 |
| 2017/0336896 | A1 | 11/2017 | Paolini, Jr. | |
| 2017/0369022 | A1* | 12/2017 | Kanto | B60R 21/215 |
| 2019/0204706 | A1 | 7/2019 | Zhao et al. | |

FOREIGN PATENT DOCUMENTS

| CN | 108169978 A | 6/2018 |
|---|---|---|
| CN | 109656055 A | 4/2019 |
| KR | 20080067068 A | 7/2008 |
| KR | 20160023732 A | 3/2016 |
| KR | 20180080472 A | 7/2018 |
| KR | 20180101128 A | 9/2018 |

* cited by examiner

ARRAY SUBSTRATE AND MANUFACTURING METHOD THEREOF, DISPLAY PANEL, DISPLAY DEVICE, DISPLAY KIT

CROSS-REFERENCE TO RELATED APPLICATION

This application is a Section 371 National Stage Application of International Application No. PCT/CN2019/128311, filed on Dec. 25, 2019, entitled "ARRAY SUBSTRATE AND MANUFACTURING METHOD THEREOF, DISPLAY PANEL, DISPLAY DEVICE, DISPLAY KIT", which claims the benefit of Chinese Patent Application No. 201910151315.9 filed on Feb. 28, 2019 with the China Patent Office, the disclosures of which are incorporated herein by reference in their entireties.

TECHNICAL FIELD

The present application relates to the technical field of display, and particularly to an array substrate and manufacturing method thereof, and a display panel, display device, display kit.

BACKGROUND

A reflective liquid crystal display panel illuminates the entire liquid crystal display panel by providing a reflective layer to reflect the light of the external environment without a backlight module. Thus, it can save electric energy. Currently, the reflective layer in the reflective liquid crystal display panel is generally made of metal materials, for example, silver or aluminum to reflect the light from the external environment.

SUMMARY

An embodiment of the present disclosure provides an array substrate, including: a base substrate, and a reflective layer located on a side of the base substrate, wherein the reflective layer includes: a plurality of micro-capsules, each of the micro-capsule including: a plurality of absorbing particles and a plurality of reflecting particles; wherein the absorbing particles are magnetic particles absorbing light; the reflecting particles are non-magnetic particles reflecting light.

In some embodiments, the absorbing particles each include: a nano magnetic layer and a non-magnetic particle; the nano magnetic layer is arranged to wrap a surface of the non-magnetic particle.

In some embodiments, a color of the absorbing particles is black, a color of the reflective particles is white, and a color of the nano magnetic layer is black.

In some embodiments, material of the nano magnetic layer contains tri-iron tetroxide.

In some embodiments, quantity of the absorbing particles equals quantity of the reflective particles.

An embodiment of the present application also provides a display panel, including the array substrate as described in any one of the above embodiments, and a color filter substrate disposed opposite to the array substrate; wherein the reflective layer is located on a side of the base substrate away from the color filter substrate.

In some embodiments, the display panel further includes: a scattering film on a side of the color filter substrate away from the array substrate; a quarter wave plate on a side of the scattering film away from the array substrate; a half wave plate on a side of the quarter wave plate away from the array substrate; and a polarizer on a side of the half wave plate away from the array substrate.

An embodiment of the present application also provides a display device, including: a display panel as described above, and a magnetic field generating device; wherein the magnetic field generating device is on a side of the reflective layer away from the color filter substrate.

In some embodiments, the magnetic field generating device includes: a first electrically conductive coil, a first power supply and a first switch; wherein the first electrically conductive coil is connected in series with the first power supply and the first switch.

In some embodiments, an orthographic projection area of the first electrically conductive coil on the base substrate is entirely overlapped with an orthographic projection area of the reflective layer on the base substrate.

An embodiment of the present application also provides a display kit, including the display device as described above, and a stylus configured to conduct writing operation on a surface of the display panel.

In some embodiments, the stylus includes: a refill, a second electrically conductive coil, a second power supply and a second switch; wherein the second electrically conductive coil is connected in series with the second power supply and the second switch, and the second electrically conductive coil is wound around the refill.

In some embodiments, the magnetic field generating device includes a first electrically conductive coil, a first power supply and a first switch; the first electrically conductive coil is connected in series with the first power supply and the first switch, and an orthographic projection area of the first electrically conductive coil on the base substrate is entirely overlapped with an orthographic projection area of the reflective layer on the base substrate.

In some embodiments, a magnetic field intensity generated by the second electrically conductive coil is less than a magnetic field intensity generated by the first electrically conductive coil.

An embodiment of the present application also provides a manufacturing method of the array substrate, including: providing a base substrate, and manufacturing a reflective layer including a plurality of micro-capsules on a side of the base substrate; wherein each of the micro-capsules includes: a plurality of reflecting particles and a plurality of absorbing particles; wherein the absorbing particles are magnetic particles absorbing light; and the reflecting particles are non-magnetic particles reflecting light.

In some embodiments, the manufacturing the reflective layer including a plurality of micro-capsules on the side of the base substrate includes: providing a protection substrate disposed opposite to the base substrate; encapsulating an ink layer into an internal space between the base substrate and the protection substrate, wherein a plurality of micro-capsules are distributed in the ink layer, and a plurality of reflecting particles and a plurality of absorbing particles are encapsulated in each of the micro-capsules.

In some embodiments, the plurality of absorbing particles are manufactured by a method including: depositing a nano-magnetic layer on surfaces of non-magnetic particles, the nano magnetic layer having color of black.

BRIEF DESCRIPTION OF THE DRAWINGS

The above and/or additional aspects and advantages of the present application will become apparent and easily understood from the following description of the Examples in conjunction with the accompanying drawings, in which.

DETAILED DESCRIPTION

Hereinafter, the present application will be described in detail. Examples of the embodiments in the present application are shown in the accompanying drawings. The same or similar reference numerals represent the same or similar elements or the elements having the same or similar functions throughout the description. In addition, the detailed descriptions of well-known technologies unnecessary for the features shown in the present application can be omitted. The embodiments described below with reference to the drawings are exemplary, and are only used to explain the present application, but can not be considered as limiting the present application.

It will be understood by those skilled in the art that, unless otherwise defined, all terms (including technical and scientific terms) used herein have the same meaning as commonly understood by one of ordinary skill in the art to which this application belongs. It should also be understood that terms such as those defined in the general dictionary should be understood to have meanings consistent with the meanings in the context of the prior art, and unless specifically defined like this, they would not be explained as idealized or overly formal meaning.

First, the introduction and explanation to several nouns evolved in the present application:

Micro-capsule: a micro-container or package sealing tiny solid particles, droplets or bubbles with a coating film or shell material.

The inventor of the present application found through research that in order to realize the handwriting function of the display panel, it is often necessary to add a handwriting touch module on a surface of the display panel, for example, resistive touch diaphragm or capacitive touch diaphragm, etc. The handwriting touch module requires continuous power supply to drive adjustment of the liquid crystal molecules so as to display the corresponding pictures. Without continuous power supply or with low power supply, the effects of handwriting and displaying are poor, leading to a worse user experience. The manufacturing process of the handwriting touch module is complicated and the cost thereof is relatively high.

The array substrate and manufacturing method thereof, and the display panel, the display device, the display kit provided in the present application are aiming to solve the above technical problems of the prior art.

With the specific embodiments, the following content in a detail way describes the technical solution of the present application and how the technical solution of the present application can solve the above technical problems.

Figure 1:
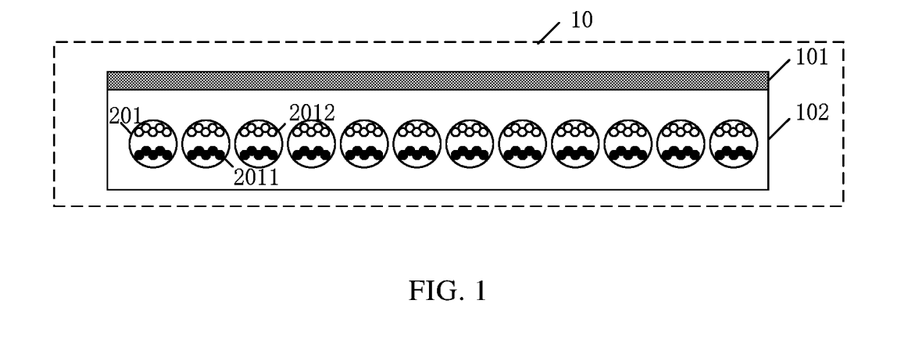
FIG. 1 is a schematic view showing a structure of an array substrate provided by embodiments of the present application.

An embodiment of the present application provides an array substrate. FIG. 1 is a schematic view showing a structure of an array substrate provided by the embodiment of the present application. As shown in FIG. 1, the array substrate 10 includes: a base substrate 101, a reflective layer 102 located on a side of the base substrate 101.

The reflective layer 102 includes: a plurality of micro-capsules 201. Each of the micro-capsule 201 includes: a plurality of absorbing particles 2011 and a plurality of reflecting particles 2012. The absorbing particles 2011 are magnetic particles used to absorb light. The reflecting particles 2012 are non-magnetic particles used to reflect light.

It should be noted that before each time of use, the array substrate 10 may be displaced above an external magnetic field generating device, and enable the reflective layer to be close to the external magnetic field generating device. The external magnetic field generating device located below the array substrate 10 is energized to generate a magnetic field. The absorbing particles 2011 are attracted by the magnetic field because absorbing particles 2011 are magnetic particles. And the absorbing particles 2011 are located on the side of the micro-capsules 201 away from the base substrate 101. The reflecting particles 2012 are not affected by the magnetic field and are displaced by the absorbing particles 2011 to the side of the micro-capsules 201 close to the base substrate 101. The reflecting particles 2012 entirely shield the absorbing particles 2011, therefore, the side of the micro-capsules 201 close to the base substrate 101 is full of the reflecting particles 2012 while the side of the micro-capsules 201 away from the base substrate 101 is full of the absorbing particles 2011. When the light is incident from any position above the array substrate 10, the reflecting particles 2012 can reflect light so as to achieve the normal display and reflection functions of the display panel containing the array substrate 10.

When the external magnetic field generating device located below the array substrate 10 is in a power-off state and does not generate a magnetic field, writing operation on the surface of the display panel containing the array substrate 10 can be conducted with a magnetic writing device (for example, a stylus). At the writing position, the writing device uses its own magnetism to attract the absorbing particles 2011 in the micro-capsules 201 to the side of the micro-capsules 201 close to the base substrate 101, and the reflecting particles 2012 are located on the side of the micro-capsules 201 away from the base substrate 101. At this moment, the absorbing particles 2011 will shield the reflecting particles 2012 corresponding to the location of the absorbing particles. Therefore, at this location, the light incident from the outside does not form reflection, and a dark state is formed at the corresponding position of the display panel, thus achieving a writing function of the display panel containing the array substrate 10. Meanwhile, an erase function after writing can be achieved by energizing the external magnetic field generating device.

The array substrate provided in the embodiments of the present application includes a reflective layer located on the side of the base substrate, the reflective layer including a plurality of micro-capsules. Each of the micro-capsule includes a plurality of absorbing particles and a plurality of reflecting particles. When the array substrate provided in the embodiment of the present application is arranged above an external magnetic field generating device, and enables the reflective layer to be close to the external magnetic field generating device, and when the external magnetic field generating device generates a magnetic field, the absorbing particles will be attracted, such that the side of the micro-capsules close to the base substrate is full of reflecting particles while the side of the micro-capsules away from the base substrate is full of absorbing particles. When the light is incident from any position above the array substrate, reflecting particles can reflect light so as to achieve the normal display and reflection functions of the display panel containing the array substrate. When the external magnetic field generating device does not generate a magnetic field, writing operation on the surface of the display panel containing the array substrate can be conducted with a magnetic writing device. At the writing position, the writing device uses its own magnetism to attract the absorbing particles to the side of the micro-capsules close to the base substrate, and the reflecting particles are located on the side of the micro-capsules away from the base substrate. At this location, the light incident from the outside does not form reflection, and a dark state is formed at the corresponding position of the display panel, thus achieving a writing function of the display panel containing the array substrate. The embodiment in the present application can achieve the normal display and reflection functions without continuous power supply, which enhances the user experience. Meanwhile, compared with the prior art, the manufacturing process is simple and has a low cost.

Based on the array substrate provided in the above embodiments, the embodiments of the present application will describe the above array substrate in further detail with reference to the drawings.

Figure 2:
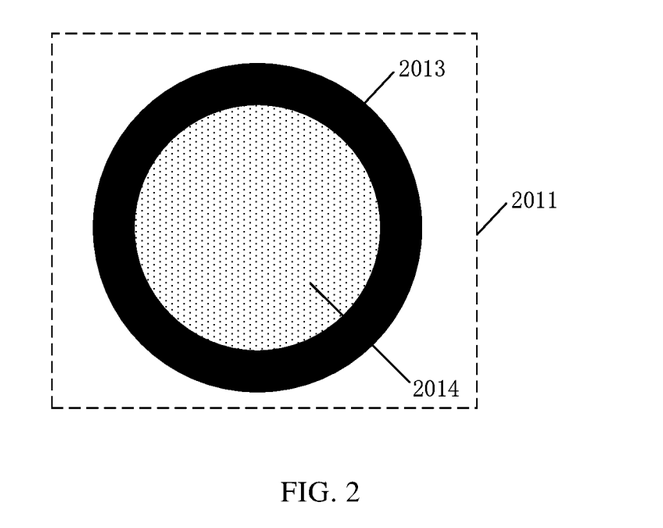
FIG. 2 is a schematic cross-sectional view showing a structure of absorbing particles provided by the embodiments of the present application.

FIG. 2 is a schematic cross-sectional view showing the structure of absorbing particle provided in the embodiment of the present application. As shown in FIG. 2, the absorbing particle 2011 includes a nano magnetic layer 2013 and a non-magnetic particle 2014; the nano magnetic layer 2013 wraps the surface of the non-magnetic particle 2014; and the color of the nano magnetic layer 2013 is black.

It should be noted that the nano magnetic layer 2013 wraps the surface of the non-magnetic particle 2014, such that the entire absorbing particle 2011 has magnetism and may be attracted by the magnetic field. In order to achieve light absorption, the color of the nano magnetic layer 2013 may be black.

In some embodiments, the color of the absorbing particles 2011 is black, the color of the reflective particles 2012 is white, and the color of the nano magnetic layer 2013 is black.

It should be noted that an object with a relatively dark color can absorb the lights incident on its surface, and that another object with a relatively light color can reflect the light incident on its surface. In order to obtain better effects of absorbing light and reflecting light, the color of the absorbing particles 2011 can be black, the color of the reflective particles 2012 can be white, and the color of the nano magnetic layer 2013 can be black. A greater color difference between black and white enables the display effect to be more obvious.

In some embodiments, the material of the nano magnetic layer 2013 contains tri-iron tetroxide ($Fe_3O_4$).

It should be noted that the color of tri-iron tetroxide is black, ensuring a better absorption of lights. Tri-iron tetroxide can be easily obtained, saving the cost in manufacturing.

In some embodiments, the quantity of the absorbing particles 2011 equals to the quantity of the reflective particles 2012.

It should be noted that the micro-capsule 201 is filled with the absorbing particles 2011 and the reflective particles 2012, and that the quantity of the absorbing particles 2011 equals to the quantity of the reflective particles 2012. The absorbing particles 2011 are attracted by the magnetic field, then the corresponding position can be filled with the reflective particles 2012, so as to avoid light leakage caused by gaps between particles.

Figure 3:
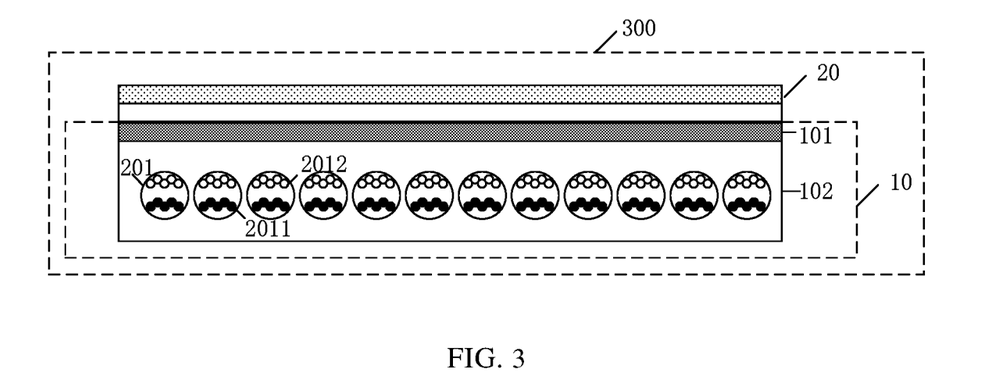
FIG. 3 is a schematic view showing a structure of a display panel provided by the embodiments of the present application.

An embodiment of the present application further provides a display panel. FIG. 3 is a schematic view showing the structure of a display panel provided in the embodiment of the present application. As shown in FIG. 3, the display panel 300 includes the array substrate 10 as described in the above embodiments and a color filter substrate 20 disposed opposite to the array substrate 10; the reflective layer 102 is positioned on the side of the base substrate 101 away from the color filter substrate 20.

It should be noted that in order to avoid an excessive thickness between the base substrate 101 and the color filter substrate 20, the reflective layer 102 can be located on the side of the base substrate 101 away from the color filter substrate 20, thus effectively reducing thickness and enhancing a display effect.

Figure 4:
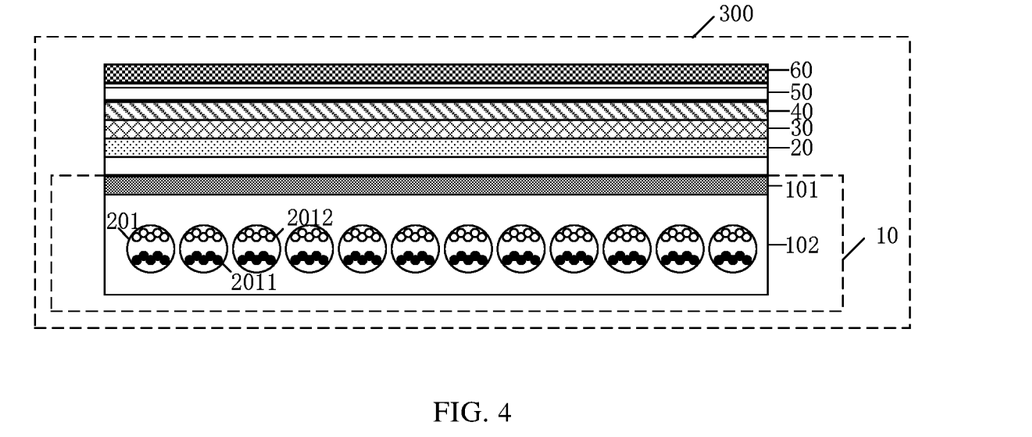
FIG. 4 is a schematic view showing a structure of another display panel provided by the embodiments of the present application.

FIG. 4 is a schematic view showing the structure of another display panel provided in the embodiments of the present application. As shown in FIG. 4, the display panel 300 further includes: a scattering film 30, a quarter wave plate 40; a half wave plate 50; and a polarizer 60 arranged sequentially along a direction away from the color filter substrate 20 on the side of the color filter substrate 20 away from the array substrate 10.

Figure 10:
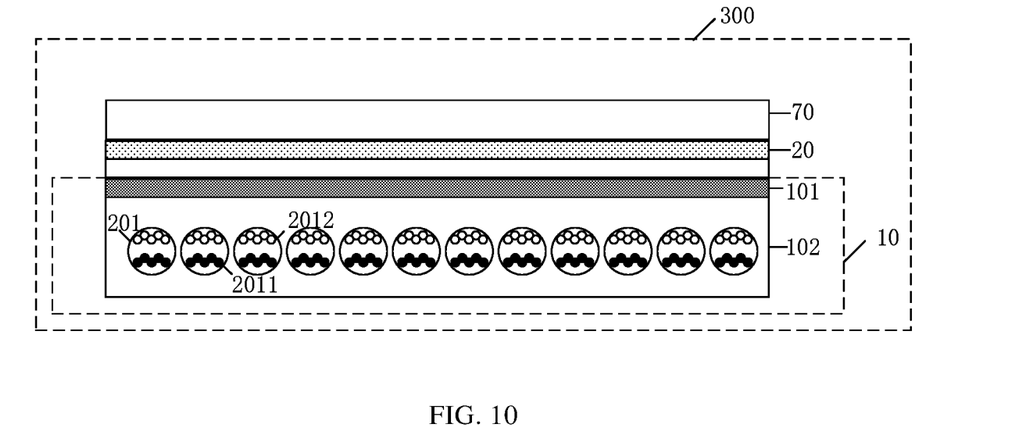
FIG. 10 is a schematic view showing a structure of a further display panel provided by the embodiments of the present application.

It should be noted that the scattering film 30, the quarter wave plate 40, the half wave plate 50, and the polarizer 60 can be integrated into a layer of film 70, and that the layer of film can be attached to the color filter substrate 20, thus reducing the thickness of the film layer and achieving a better display effect (see FIG. 10).

A brief introduction of the display principle of the display panel provided by the embodiment of the present application:

As shown in FIG. 4, an external natural light is incident from above the array substrate 10, and the light passes through the polarizer 60 to form a linearly polarized light having a first polarization direction. The linearly polarized light having the first polarization direction passes through the half-wave plate 50, and the first polarization direction of the linearly polarized light rotates at a specified angle to form a linearly polarized light with a second polarization direction, the linearly polarized light with the second polarization direction passes through the quarter wave plate 40 to form a circularly polarized light, and then the circularly polarized light is incident on the reflective layer 102 through the scattering film 30. When the absorbing particles 2011 are above the reflective layer 102, the absorbing particles 2011 absorb the light instead of reflecting the light. When the reflecting particles 2012 are above the reflective layer 102, the reflecting particles 2012 reflect the light. The circularly polarized light reflected by the reflective layer 102 is incident on the color filter substrate 20. After the light shows a corresponding color, it is incident on the scattering film 30 through the color filter substrate 20, and the light is scattered to become more uniform. Passing through the quarter wave plate 40, the circularly polarized light forms a linearly polarized light having the same polarization direction with the second polarization direction. Passing through the halfwave plate 50, the linearly polarized light having the same polarization direction as the second direction is converted again to the linearly polarized light having the same polarization direction with the first polarization direction, and exits through the polarizer 60, so as to realize the display of a reflective display panel.

Figure 5:
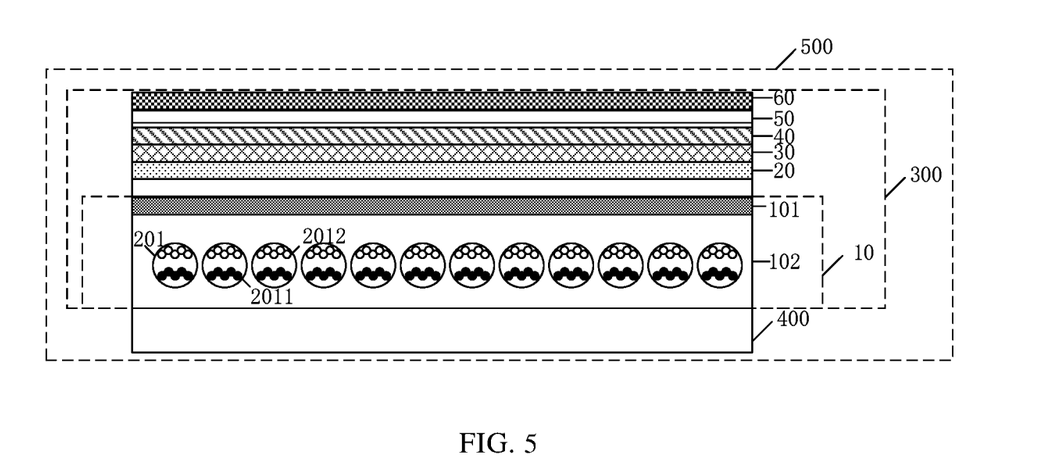
FIG. 5 is a schematic view showing a structure of a display device provided by the embodiments of the present application.

The embodiment of the present application further provides a display device. FIG. 5 is a schematic view showing the structure of a display device provided in the embodiment of the present application. As shown in FIG. 5, the display device 500 includes: a display panel 300 provided in the above embodiment, and a magnetic field generating device 400. The magnetic field generating device 400 is located on the side of the reflective layer 102 away from the color filter substrate 20.

It should be noted that the magnetic field generating device 400 can be energized to generate a magnetic field and attract the absorbing particles 2011, so as to achieve the displaying and handwriting functions.

Figure 6:
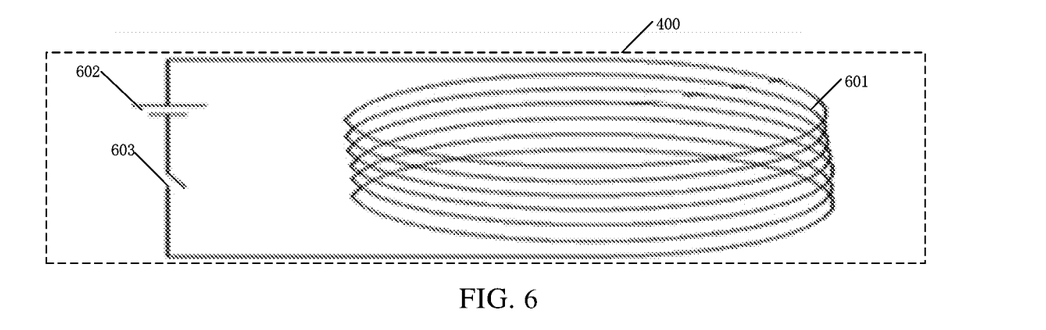
FIG. 6 is a schematic view showing a structure of a magnetic field generating device provided by the embodiments of the present application.

FIG. 6 is a schematic view showing the structure of a magnetic field generating device provided in the embodiment of the present application. As shown in FIG. 6, the magnetic field generating device 400 includes: a first electrically conductive coil 601, a first power supply 602 and a first switch 603.

The first electrically conductive coil 601 is connected in series with the first power supply 602 and the first switch 603, and the orthographic projection area of the first electrically conductive coil 601 on the base substrate 101 is entirely overlapped with the orthographic projection area of the reflective layer 102 on the base substrate 101.

It should be noted that the orthographic projection area of the first electrically conductive coil 601 on the base substrate 101 is entirely overlapped with the orthographic projection area of the reflective layer 102 on the base substrate 101, thus ensuring all of the absorbing particles 2011 contained in the array substrate 10 can be attracted by the magnetic field generated by the magnetic field generating device 400, so as to improve the displaying effect.

Figure 7:
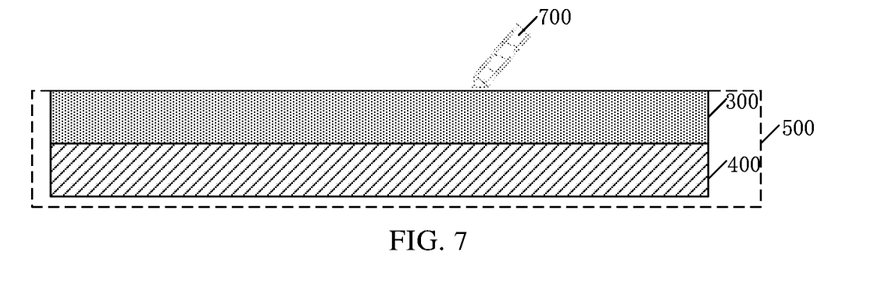
FIG. 7 is a schematic view showing a structure of a display kit provided by the embodiments of the present application.

The embodiments of the present application further provide a display kit. FIG. 7 is a schematic view showing the structure of the display kit provided in the embodiment of the present application. As shown in FIG. 7, the display kit includes the display device 500 provided in the above embodiments and a stylus 700 used to conduct a writing operation on the surface of the display panel 300.

The specific working process of the display kit in the embodiment of the present application will be described in detail below.

Before the display kit is used each time, the magnetic field generating device 400 is energized in advance to generate the magnetic field. Because absorbing particles 2011 have magnetism, the absorbing particles 2011 are attracted by the magnetic field to locate on the side close to the magnetic field generating device 400. The reflecting particles 2012 are not affected by the magnetic field and are located to the side away from the magnetic field generating device 400. At this moment, any location on the display panel can reflect lights.

In the case of sufficient external environment light source, the display content of the display panel is realized by the control of the liquid crystal deflection direction of the pixels conducted by the array substrate. In the case of a continuous magnetic field generated by the magnetic field generating device 400, even if the stylus 700 conducts a writing operation on the surface of the display panel 300, the display content will not be varied as the writing action of the stylus 700, and the display panel can realize a normal displaying function.

When the magnetic field generating device is in a power-off state and does not generate the magnetic field, and in the case of the display panel being energized, the stylus 700 conducts the writing operation on the surface of the display panel. At the writing location of the stylus 700, absorbing particles 2011 are attracted by the magnetic field generated by the stylus 700 to the side close to the stylus 700. At this moment, the reflecting particles 2012 are located on the side away from the stylus 700. In such a case, the reflecting particles 2012 are shielded by the absorbing particles 2011. Even if the display panel is energized and liquid crystals are in a deflection state, the writing location are not able to reflect external light, so as to realize the writing operation of the display panel, and the written content can be erased by energizing the magnetic field generating device.

When the magnetic field generating device is in the power-off state and does not generate the magnetic field, and in the case of the display panel also being in the power-off state, and when the stylus 700 conducts the writing operation on the surface of the display panel, the reflecting particles 2012 are shielded by the absorbing particles 2011, the writing location are not able to reflect the external light, so as to realize the writing operation of the display panel in the power-off state, and the written content can be erased by energizing the magnetic field generating device.

Figure 8:
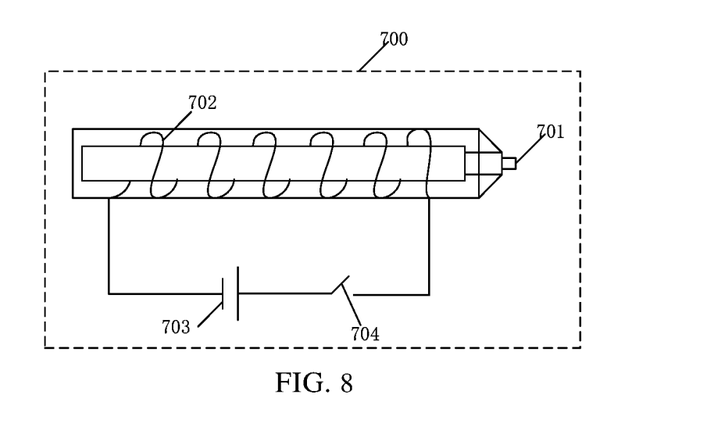
FIG. 8 is a schematic view showing a structure of a stylus provided by the embodiments of the present application.

FIG. 8 is a schematic view showing the structure of a stylus provided in the embodiment of the present application. As shown in FIG. 8, the stylus 700 includes: a refill 701, a second electrically conductive coil 702, a second power supply 703 and a second switch 704.

The second electrically conductive coil 702 is connected in series with the second power supply 703 and the second switch 704, and the second electrically conductive coil 702 is wound around the refill 701.

It should be noted that the second power supply 703 can provide current for second electrically conductive coil 702 to enable second electrically conductive coil 702 under the driven by the current to generate the magnetic field and conduct the magnetic field through the refill 701 to attract the magnetic particles.

In some embodiments, the magnetic field generating device 400 includes a first electrically conductive coil 601. The magnetic field intensity generated by the second electrically conductive coil 702 is less than the magnetic field intensity generated by the first electrically conductive coil 601.

It should be noted that when the magnetic field generating device 400 is energized continuously, the magnetic field intensity generated by the second electrically conductive coil 702 is less than the magnetic field intensity generated by the first electrically conductive coil 601, and the magnetic field generating device 400 can more easily attract black magnetic absorbing particles 2011, such that the stylus 700 has no effect on the attraction of the absorbing particles 2011, and the magnetic field generating device 400 can attract the absorbing particles 2011 to the bottom of the reflective layer 102, so as to realize the normal display and reflection functions of the display panel.

In some embodiments, the refill 701 is made of soft iron materials.

The embodiment of the present application further provides a manufacturing method of the array substrate. The manufacturing method includes: providing a base substrate, manufacturing the reflective layer including a plurality of micro-capsules on a side of the base substrate; wherein each of the micro-capsule includes a plurality of reflecting particles and a plurality of absorbing particles; the absorbing particles are magnetic particles used to absorb light; the reflecting particles are non-magnetic particles used to reflect light.

In some embodiments, the above step of manufacturing the reflective layer including the plurality of micro-capsules on the side of the base substrate includes:

providing a protection substrate, the protection substrate being disposed opposite to the base substrate; encapsulating an ink layer into an internal space between the base substrate and the protection substrate, a plurality of micro-capsules being distributed in the ink layer, a plurality of reflecting particles and a plurality of absorbing particles being encapsulated in each of the micro-capsules.

In some embodiments, the above manufacturing method of the plurality of absorbing particles includes:

depositing a nano-magnetic layer on the surface of non-magnetic particles, and the nano magnetic layer having color of black.

In specific implementation, the non-magnetic particles may be black particles, an electroless plating method is used on the surface of the black particles to deposit the nano-magnetic layer, and the color of the nano-magnetic layer is black. Of course, in the actual manufacturing process, the color of the nano-magnetic layer may not be black. In this case, the electroless plating method is used on the surface of the nano-magnetic layer to deposit a coating which has the color of black.

FIG. 9A-FIG. 9G show a manufacturing method of a display panel provided in the embodiments of the present application. The following will describe the manufacturing of the display panel including the array substrate provided in the embodiments of the present application in further detail with reference to the drawings.

Figure 9A:
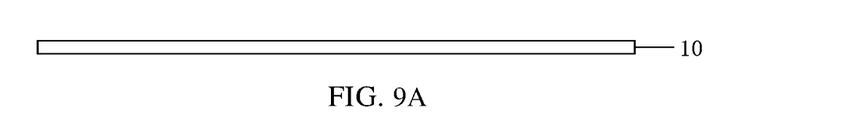
FIG. 9A-FIG. 9G are schematic views showing structures of different manufacturing processes of a display panel provided by the embodiments of the present application.

As shown in FIG. 9A, first, the array substrate 10 is manufactured. The manufacturing method of the respective layers of film in the array substrate 10 is the same as the manufacturing method of the respective layers of film of the array substrate of the conventional reflective liquid crystal display panel. Therefore, it will be omitted herein.

Figure 9B:
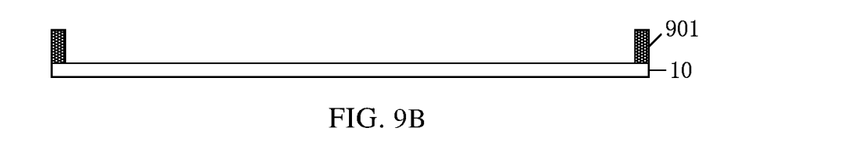

Then, as shown in FIG. 9B, a first frame sealant 901 is coated around the array substrate 10. The specific coating method of the first frame sealant 901 is the same as that in the prior art. Therefore, it will be omitted herein.

Figure 9C:
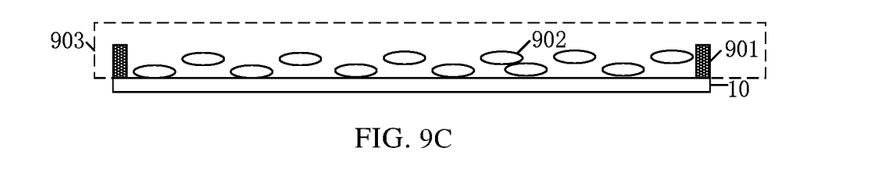

Then, as shown in FIG. 9C, the liquid crystals 902 are injected into the space formed by the first frame sealant 901 to form a liquid crystal layer 903. The specific injection method of the liquid crystals 902 is the same as that in the prior art. Therefore, it will be omitted herein.

Figure 9D:
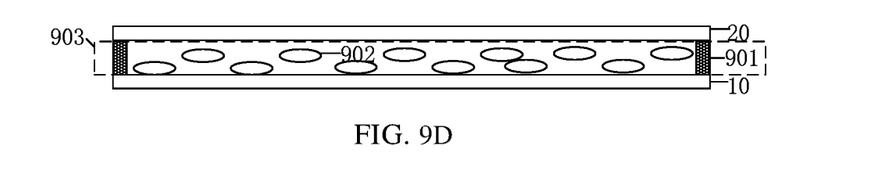

Then, as shown in FIG. 9D, the color filter substrate 20 is manufactured, and the color filter substrate 20 is disposed opposite to the array substrate 10. The specific manufacturing method of the color filter substrate 20 and the specific disposing method are the same as those in the prior art. Therefore, it will be omitted herein.

Figure 9E:
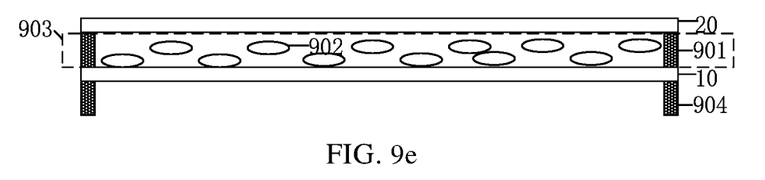

Then, as shown in FIG. 9E, a second frame sealant 904 is coated around the side of the array substrate 10 away from the color filter substrate 20. The specific coating method of the second frame sealant 904 may be the same as the coating method of the first frame sealant 901.

Figure 9F:
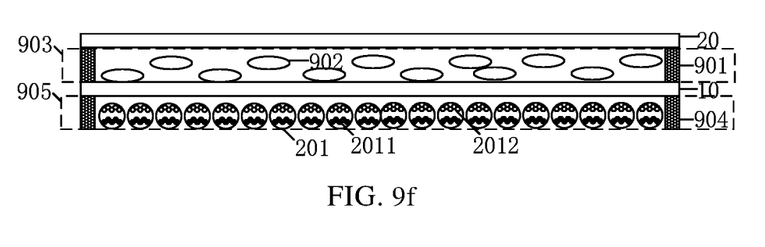

Then, as shown in FIG. 9F, an ink layer 905 is manufactured within the space formed by the second frame sealant 904. A plurality of micro-capsules 201 are distributed in the ink layer 905, and a plurality of reflecting particles 2012 and a plurality of absorbing particles 2011 are encapsulated in each of the micro-capsules.

Figure 9G:
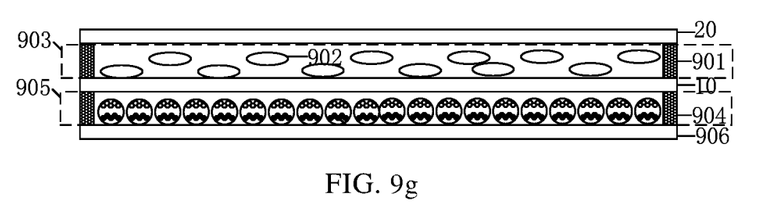

Then, as shown in FIG. 9G, through a pasting process, the array substrate 10, the ink layer 905 and the protection layer 906 are encapsulated. The protection layer 906 in the embodiments of the present application may be transparent or may not be transparent.

Those skilled in the art can understand that in the description of this application, it is necessary to understand that the orientation or positional relationship indicated by the terms "center", "upper", "lower", "front", "back", "left", "right", "vertical", "horizontal", "top", "bottom", "inner", "outer", etc. is based on the orientation or positional relationship shown in the drawings, and is only for the convenience of describing the present disclosure and simplifying the description, rather than indicating or implying that the device or element referred to must have a specific orientation, be configured and operated in a specific orientation, and therefore cannot be construed as limiting the present disclosure.

The terms "first" and "second" are used for description purposes only, and cannot be understood as indicating or implying relative importance or implicitly indicating the number of indicated technical features. Thus, the features defined as "first" or "second" may explicitly or implicitly include one or more of the features. In the description of the present disclosure, unless otherwise stated, "a plurality of" means two or more.

In the description of this application, it should be noted that the term "connection" should be understood in a broad sense, unless otherwise specified and limited clearly, for example, it can be a fixed connection, a detachable connection, or an integral connection; it can be directly connected, or indirectly connected through an intermediate medium, or the internal connection between two elements. For those of ordinary skill in the art, the specific meaning of the above terms in the present disclosure may be understood in specific situations.

The above description is only part of the embodiments of the present application. It is noted that, without departing from the principle in the present application, those skilled in the art could make various improvements and modifications, which should be considered to fall within the scope of the present application.

What is claimed is:

1. A display device, comprising: a display panel and a magnetic field generating device, the display panel comprising an array substrate and a color filter substrate disposed opposite to the array substrate, wherein the array substrate comprises a base substrate and a reflective layer located on a side of the base substrate away from the color filter substrate;

wherein the reflective layer comprises a plurality of micro-capsules, each of the micro-capsules includes a plurality of absorbing particles and a plurality of reflecting particles;

wherein the absorbing particles are magnetic particles absorbing light, and the reflecting particles are non-magnetic particles reflecting light;

wherein the magnetic field generating device is on a side of the reflective layer away from the color filter substrate;

wherein the magnetic field generating device comprises: a first electrically conductive coil, a first power supply and a first switch;

wherein the first electrically conductive coil is connected in series with the first power supply and the first switch; and wherein an orthographic projection area of the first electrically conductive coil on the base substrate is entirely overlapped with an orthographic projection area of the reflective layer on the base substrate.

2. A display kit, comprising the display device according to claim 1, and a stylus configured to conduct writing operation on a surface of the display panel.

3. The display kit according to claim 2, wherein the stylus comprises: a refill, a second electrically conductive coil, a second power supply and a second switch;

wherein the second electrically conductive coil is connected in series with the second power supply and the second switch, and the second electrically conductive coil is wound around the refill.

4. The display kit according to claim 3, wherein the magnetic field generating device comprises a first electrically conductive coil, a first power supply and a first switch; the first electrically conductive coil is connected in series with the first power supply and the first switch, and an orthographic projection area of the first electrically conductive coil on the base substrate is entirely overlapped with an orthographic projection area of the reflective layer on the base substrate.

5. The display kit according to claim 4, wherein a magnetic field intensity generated by the second electrically conductive coil is less than a magnetic field intensity generated by the first electrically conductive coil.

6. The display device according to claim 1, wherein the magnetic field generating device is energized to generate a magnetic field, the magnetic field attracting the absorbing particles onto sides of the micro-capsules away from the base substrate, and the reflecting particles are located on sides of the micro-capsules close to the base substrate.

7. The display device according to claim 6, wherein the reflecting particles entirely shield the absorbing particles.

8. The display kit according to claim 2, wherein the magnetic field generating device is in a power-off state and the stylus generates a magnetic field, the magnetic field of the stylus attracting the absorbing particles onto sides of the micro-capsules close to the stylus, and the reflecting particles are located on sides of the micro-capsules away from the stylus.

9. The display device according to claim 1, wherein the absorbing particles each comprise: a nano magnetic layer and a non-magnetic particle; the nano magnetic layer is arranged to wrap a surface of the non-magnetic particle.

10. The display device according to claim 1, wherein a color of the absorbing particles is black, a color of the reflective particles is white, and a color of the nano magnetic layer is black.

11. The display device according to claim 1, wherein a material of the nano magnetic layer contains tri-iron tetroxide.

12. The display device according to claim 1, wherein a quantity of the absorbing particles equals a quantity of the reflective particles.

13. The display device according to claim 1, further comprising:
- a scattering film on a side of the color filter substrate away from the array substrate;
- a quarter wave plate on a side of the scattering film away from the array substrate;
- a half wave plate on a side of the quarter wave plate away from the array substrate; and
- a polarizer on a side of the half wave plate away from the array substrate.

* * * * *

UNITED STATES PATENT AND TRADEMARK OFFICE
CERTIFICATE OF CORRECTION

| | | |
|---|---|---|
| PATENT NO. | : 12,216,374 B2 | Page 1 of 1 |
| APPLICATION NO. | : 16/964696 | |
| DATED | : February 4, 2025 | |
| INVENTOR(S) | : Han et al. | |

It is certified that error appears in the above-identified patent and that said Letters Patent is hereby corrected as shown below:

On the Title Page
Item (73) Assignee, Please change "HEIFEI BOE OPTOELECTRONICS TECHNOLOGY CO., LTD." to --HEFEI BOE OPTOELECTRONICS TECHNOLOGY CO., LTD.--.

Signed and Sealed this
Twenty-sixth Day of August, 2025

Coke Morgan Stewart
*Acting Director of the United States Patent and Trademark Office*